April 8, 1924.
F. OUTREY
1,489,332
COMPACT AUTOMATIC OPTICAL PROJECTING APPARATUS FOR ADVERTISING
Filed Feb. 3, 1921
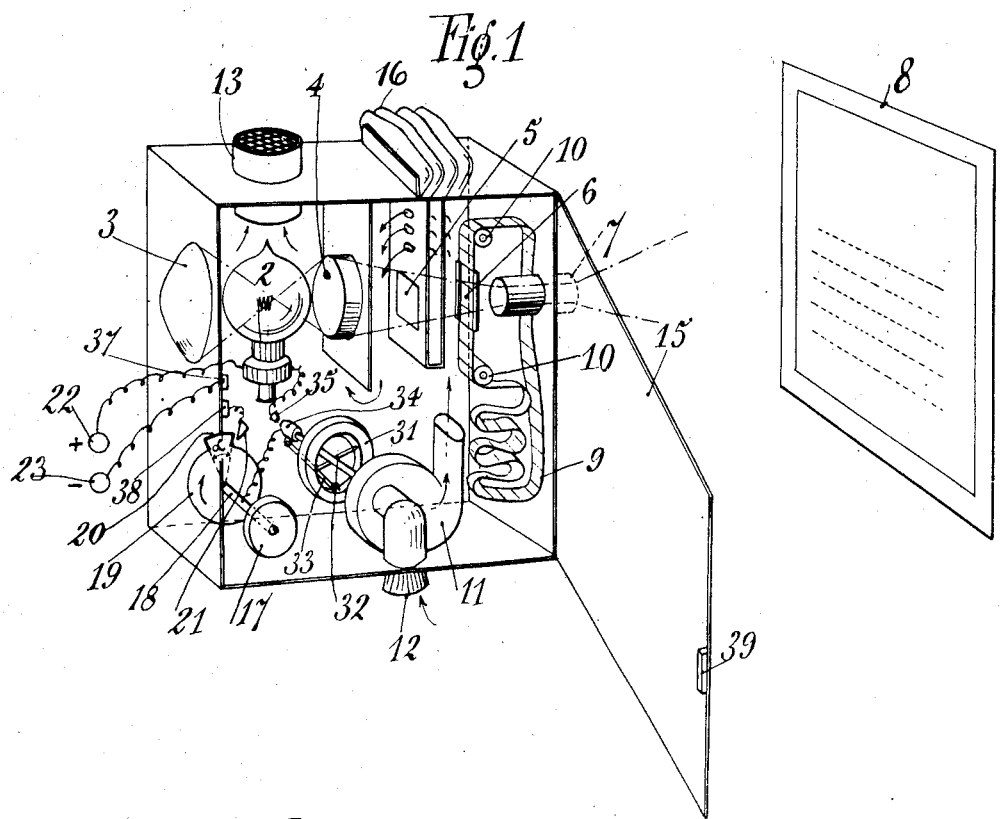
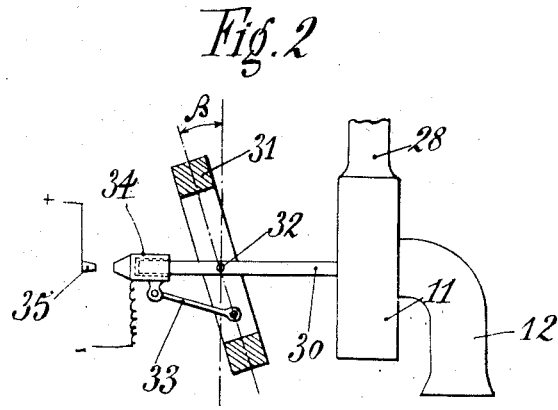
Inventor:
Fernand Outrey
By [signature]
Atty.

Patented Apr. 8, 1924.

1,489,332

UNITED STATES PATENT OFFICE.

FERNAND OUTREY, OF PARIS, FRANCE, ASSIGNOR TO PATHÉ-CINÉMA, ANCIENS ETABLISSEMENTS PATHÉ FRÈRES, OF PARIS, FRANCE, A JOINT STOCK COMPANY OF FRANCE.

COMPACT AUTOMATIC OPTICAL PROJECTING APPARATUS FOR ADVERTISING.

Application filed February 3, 1921. Serial No. 442,060.

*To all whom it may concern:*

Be it known that I, FERNAND OUTREY, citizen of the Republic of France, residing at Paris, France, have invented certain new and useful Improvements in Compact Automatic Optical Projecting Apparatus for Advertising, of which the following is a specification, reference being had therein to the accompanying drawing.

My invention relates to an apparatus for effecting automatic optical projections for advertising purposes in public places, by means of optical projectors using films or not, in which all danger of fire is eliminated, rendering any attention unnecessary and at the same time producing results equal to those hitherto obtained by ordinary optical projecting means either stationary or kinematographic.

It has already been proposed to employ endless band films in projectors to reproduce continuously a given series of pictures.

For a long time alternating stationary and animated projections have been used to attract and retain public attention.

The nature of an announcement imposes on the apparatus the necessity of stopping films for a sufficient length of time during the course of a kinematographic projection without damage resulting therefrom.

The object of the present invention is to operate under all the above stated conditions without the aid of an operator and to carry them out at the desired time, automatically, by combining the necessary components in a closed apparatus suitable of being employed in any situation where the ingenuity of publicity experts can desire.

The projections obtained by the apparatus forming the subject of my invention may vary vastly in dimensions, from that of the quite small screen placed in a shop, on a desk, in a show window, on a door, beneath an arch, to screens of all sizes placed against walls, in railway stations, on kiosques, buildings, on the sides of a special vehicle, inside a public vehicle, passing through screens suspended in passages, in saloons, beneath chandeliers, on which the projections are apparent by reflection or transparence.

The apparatus, forming a unit of compact dimensions, may be disposed in any suitable place to effect, with the aid of a suitable screen surface, optical projections without impairing the general beauty of the surroundings and may have any form conducive to the decoration thereof.

A luminous advertising apparatus in accordance with my invention comprises a casing of incombustible material, which contains the pictures to be projected, the lighting and projecting means, the actuating mechanism, a time controlling device for controlling the circuit of the luminous source for lighting the pictures, which time controlling device opens and closes the said circuit at predetermined hours. There are also provided means for absorbing the heat rays of the various luminous sources, before the same reach the film. There is moreover provided a circuit breaker actuated by the door of the casing and controlling the circuit of the luminous source; there is also a fan for blowing cool air against the film and a centrifugal governor mounted on the axis of the said fan and controlling the circuit of the luminous source.

The source of light preferably consists in one or more electric incandescent lamps, which recent progress has enabled to be used for quite powerful projection, but judicious arrangement and the use of the cooling system described later permit even the employment of open incandescent lamps, lamps of the Nernst type and the like, and automatic arc lamps of various kinds.

The lantern slides may be of any suitable form and arrangement mounted or not on slide carriers.

The slide carriers may assume the form of discs, bands or the like.

The movement of displacement of the images may have uniform speed, be intermittent or have variable speed.

The cooling system is based on the enclosure of the whole in a casing of metal or one which is simply non-inflammable and of which the dimensions and the heat removing capacity are determined in relation to the volume enclosed, (surface, ribs, water or air circulation).

This arrangement permits an entire film for instance to burn, in the event of accidental ignition, without any flame being able to reach outside.

In the case where the amount of heat developed by the luminous source and the heating produced on the slide necessitates it, such heat is absorbed and removed by means of a circulation of air effected by simple convection or better by a fan which sucks air from the outside, projects it against the film at the spot where the light is liable to heat it, then causes it to circulate around the apparatus in the various regions to be cooled and finally drives it out after having forced it to circulate around the luminous source.

The entry and exit of the air occurs through apertures of appropriate dimensions, provided with wire gauze sufficient to prevent any spreading of fire to the outside in the event of an unforeseen accident.

Between the condenser, i. e. the optical illuminating system, and the film is disposed, if the power of the projection so necessitates, a tank or vessel with transparent parallel walls containing a liquid adapted to intercept heat rays. The liquid is cooled by external ribs, and by the circulation of air from the fan.

The safety arrangements comprise:
The metal or non-inflammable casing.
The wire gauze provided over the air inlet and outlet.

Moreover, the apparatus being intended to be set in operation without any attention, the electric lamp is lighted by a special device mounted on the fan or its motor displaced by the pressure of the air or by centrifugal action, such device establishing contact only when the fan is in operation.

Finally there is the contact ensuring the lighting of the electric lamp only when the door of the apparatus is closed.

In view of the use of the apparatus at places where the projection shall occur only during certain hours, a clock device is added to the apparatus which can be enclosed in the block or disposed in an easily accessible situation.

This clock device closes the circuit of the electric lamp only at the hours during which the apparatus shall operate.

Various constructional forms of the apparatus according to my invention are shown by way of example on the accompanying drawings, in which:—

Fig. 1 is a diagrammatic perspective view of the entire advertising apparatus, the door thereof being shown open. Fig. 2 is a sectional detail view showing the ventilator and its centrifugal governor.

The apparatus 1 (Fig. 1) comprises a closed metal box provided with a door 15 to enable the various parts of the apparatus to be put in place, and also permitting repairs and film changes to be made. The box has two ventilating flues 12 and 13, both covered with wire gauze.

The apparatus 1 encloses the following main elements:

An optical system consisting of a luminous source 2, a reflecting mirror 3, a converging lens 4, and an object glass 7 for projecting.

A cooling arrangement comprising:
A tank for liquid 5 with double walls for facilitating the circulation of a current of air, provided with cooling ribs 16 disposed on the exterior of the apparatus, and a fan 11.

A film 6 the travel of which is effected by an unwinding and driving contrivance 10 of known construction.

A clock device.
Two safety devices.
The operation is as follows:

The luminous rays emitted by the lamp 2 are reflected by the mirror 3; the optical system 4, after having condensed and refracted a portion of the rays produces an emergent luminous beam which traverses the tank of liquid 5; the obsorption of a considerable portion of the heat rays is thus ensured. The luminous beam emerging after having traversed the tank 5, powerfully illuminates the film 6, which serves as the luminous object with respect to the projecting apparatus proper 7. This apparatus produces on the screen 8 an image of the film 6.

The film unwinding automatically, a succession of images is received on the screen 8.

The air, the circulation of which is represented by the arrows in Fig. 1 is sucked in from the outside through the intake flue 12 by the fan 11; it circulates along the film 6, on the part most exposed to the luminous rays, sweeps over the walls of the tank 5 and partly traverses same, circulates around the luminous source 2 and escapes through the outlet 13 provided like the inlet 12 with wire gauze.

A clock device enables the lamp 2 to be lighted at the desired hours of the day and for the selected periods.

It consists essentially of a clockwork mechanism 17 determining the rotation of a spindle 18 at a speed such that this spindle performs a complete rotation of 360° in 24 hours.

The spindle 18 carries a disc 19 provided, on a sector of an angle α, with a metal segment 20 of a radius greater than the radius of the disc 19.

The spindle 18 and consequently the metal segment 20 is permanently connected to an electric supply 23.

When the segment 20 during the rotation of the spindle 18 is brought into engagement with an electric contact 21 connected to the second terminal 22 of the electric supply by way of the lamp 2, the electric circuit 22—2—21—19—18—23 is closed and the lamp lighted. The circuit remains closed, as long as, in the course of the rotation of the spindle 18, the segment 20 remains in engagement with the contact 21.

The disc 19 may be provided with several such contact segments, ensuring the illumination of the contrivance during any desired periods of the day and for the desired length of time.

The safety system comprises the following elements: A device preventing lighting of the lamp 2, if the fan 11 is stopped for any reason, there being consequently no cooling of the film; a device preventing the lighting of the lamp 2 if the door 15 is not shut and if consequently the apparatus 1 is not entirely closed, in order to prevent any danger of spreading of fire.

The means preventing the lamp 2 from being lighted if the fan 11 does not operate at a sufficient speed or not at all, comprises the following elements:

The shaft 30 (Fig. 2) driving the fan 11 and driven by an electro motor carries a ring 31, pivoted on a spindle 32 fast with the shaft 30 and perpendicular to its axis. The ring 31 is jointed to a connecting rod 33, which in turn is jointed to a slide 34 carried by the shaft 30 and coaxial therewith. This metal slide is permanently connected to the terminal 23 and can come into engagement with the electric contact 35 connected by the lamp 2, to the terminal 22.

When the fan 11 does not act, the ring 31 is inclined at a certain angle β relatively to a plane perpendicular to the axis of the shaft 30, with the result that the electric circuit 22—2—35—34—23 is open and the lamp 2 is not alight.

When the fan is running, the rotation of the shaft 30 causes the rotation of the ring 31 and the centrifugal force tends to bring the ring 31 into a plane perpendicular to the shaft 30. The connecting rod 33 thrusts forward the slide 34 which closes the electric circuit 22—2—35—34—23. The lamp 2 is now lighted.

The second safety device comprises the following elements. The door 15 carries a contact 39, which can enter into engagement with two electric contacts 37 and 38. When the door 15 is open the circuit 22—2—37—39—38—23 is interrupted and the lamp 2 cannot light.

In practice, the contact breakers 20, 21, of the clock device 25—27 or 34—35 of the fan and 37—38—39 of the door of the automatically acting apparatus are arranged in series in the same electric circuit as the lamp 2, in such a manner that the lamp can light only at the selected times, if the fan operates and if the door is shut.

I claim:

In a luminous advertising apparatus, a casing of incombustible material adapted to contain the advertising matter to be projected, projecting means, means for shifting the advertising matter, a light source in connection with the said projecting means, an electric circuit including said source of light, a ventilator for blowing cool air against the said advertising matter, a circuit opening and closing device, and a centrifugal regulator mounted on the shaft of the said ventilator, and adapted to control the said circuit opening and closing device.

In testimony whereof I have hereunto affixed my signature in the presence of two witnesses.

FERNAND OUTREY.

Witnesses:
LOUIS GARDET,
HENRI MONIN.